United States Patent
Peponides

(10) Patent No.: US 10,277,310 B2
(45) Date of Patent: Apr. 30, 2019

(54) DYNAMIC SPATIAL ALLOCATION OF SATELLITE CAPACITY BASED ON MOBILE VESSEL LOAD FORECASTING

(71) Applicant: ViaSat, Inc., Carlsbad, CA (US)

(72) Inventor: George M. Peponides, Encinitas, CA (US)

(73) Assignee: Viasat, Inc., Carlsbad, CA (US)

( * ) Notice: Subject to any disclaimer, the term of this patent is extended or adjusted under 35 U.S.C. 154(b) by 61 days.

(21) Appl. No.: 15/433,876

(22) Filed: Feb. 15, 2017

(65) Prior Publication Data

US 2018/0234166 A1    Aug. 16, 2018

(51) Int. Cl.
*H04B 7/185* (2006.01)
*H04W 72/04* (2009.01)
(Continued)

(52) U.S. Cl.
CPC ....... *H04B 7/18513* (2013.01); *B64G 1/1007* (2013.01); *G08G 5/0082* (2013.01); *H04B 7/2041* (2013.01); *H04L 41/0886* (2013.01); *H04L 41/0896* (2013.01); *H04L 43/0882* (2013.01); *H04L 43/16* (2013.01); *H04L 47/822* (2013.01); *H04L 47/823* (2013.01); *H04L 47/826* (2013.01); *H04W 72/046* (2013.01); *H04W 72/048* (2013.01)

(58) Field of Classification Search
None
See application file for complete search history.

(56) References Cited

U.S. PATENT DOCUMENTS

| 5,448,621 A | 9/1995 | Knudsen |
| 6,067,045 A * | 5/2000 | Castelloe .......... G01S 5/02 342/357.43 |

(Continued)

FOREIGN PATENT DOCUMENTS

JP    H08278365 A    10/1996

OTHER PUBLICATIONS

Radzik, et al.; Satellite System Performance Assessment For In-Flight Entertainment and Air Traffic Control; Space Communications 21 (2207/2008) 15 pgs.

(Continued)

*Primary Examiner* — Phuongchau Ba Nguyen
(74) *Attorney, Agent, or Firm* — Holland & Hart LLP

(57) ABSTRACT

Methods, systems, and devices are described for providing dynamic spatial allocation of satellite capacity based on aircraft load forecasting. In embodiments, a satellite communications system provides network access service over a service area via a plurality of satellite user beams, predicts spatial network resource demand for the service area over one or more service periods based at least in part on forecasted travel paths of a plurality of mobile multi-user terminals over the one or more service periods and respective predicted service demands for the plurality of mobile multi-user terminals, determines a satellite capacity resource configuration for the plurality of satellite user beams for the one or more service periods based on the predicted spatial network resource demand, and then adapts at least one characteristic of the plurality of satellite user beams for the one or more service periods based on the determined satellite capacity resource configuration.

22 Claims, 11 Drawing Sheets

(51) Int. Cl.
*H04L 12/911* (2013.01)
*H04L 12/26* (2006.01)
*H04L 12/24* (2006.01)
*H04B 7/204* (2006.01)
*B64G 1/10* (2006.01)
*G08G 5/00* (2006.01)

(56) References Cited

U.S. PATENT DOCUMENTS

| | | | |
|---|---|---|---|
| 6,775,251 B1 * | 8/2004 | Wiedeman | H04B 7/18558 |
| | | | 370/316 |
| 7,107,062 B2 * | 9/2006 | Cruz | H01Q 1/246 |
| | | | 455/453 |
| 7,356,389 B2 | 4/2008 | Hoist et al. | |
| 8,260,650 B2 | 9/2012 | Miller | |
| 8,494,445 B2 | 7/2013 | Miller | |
| 8,554,458 B2 | 10/2013 | Sawhill et al. | |
| 9,171,473 B1 | 10/2015 | McNally et al. | |
| 9,973,268 B1 * | 5/2018 | Husted | H04B 7/18534 |
| 2008/0133284 A1 | 6/2008 | Birch et al. | |
| 2010/0312612 A1 | 12/2010 | Carr et al. | |
| 2012/0021740 A1 | 1/2012 | Vaidyanathan et al. | |
| 2013/0021740 A1 | 1/2013 | Hamand et al. | |
| 2015/0381263 A1 * | 12/2015 | Lejnell | H04B 7/18508 |
| | | | 370/316 |

OTHER PUBLICATIONS

Chiti, et al.; Advanced Dynamic resource Allocation Schemes For Satellite Systems; IEEE International Conference on, vol. 3, 3 pgs, 2005.

* cited by examiner

DYNAMIC SPATIAL ALLOCATION OF SATELLITE CAPACITY BASED ON MOBILE VESSEL LOAD FORECASTING

BACKGROUND

The present disclosure relates to wireless communications in general, and in particular, to allocation of satellite capacity involving mobile vessel communications.

SUMMARY

Methods, systems, and devices for dynamically allocating satellite capacity based on mobile vessel load forecasting are described. In some examples, a multi-beam satellite system may provide network access service to passengers on mobile vessels (e.g., aircraft, ships, trains, etc.) within a service area via a plurality of satellite user beams. For example, multi-user access terminals on the mobile vessels may enable passengers to access the Internet (or other network) via a two-way communication link with a multi-beam satellite. Due to the large number of passengers on a particular mobile vessel, the network resource demands for the mobile vessel may be significant. In addition, given the mobile nature and the high rate of speed, the network resource demands within a particular geographic area may vary significantly over a relatively short period of time as various mobile vessels enter and leave that particular geographic area.

A network resource manager of the satellite system may predict spatial network resource demand for the service area over one or more service periods. This prediction may be based on forecasted travel paths of one or more mobile vessels and a respective predicted network demand for a plurality of mobile multi-user terminals on the one or more mobile vessels. From the predicted spatial network resource demand, the network resource manager may determine a satellite capacity resource configuration for the plurality of satellite user beams for the one or more service periods. The network resource manager may then use the satellite capacity resource configuration to adapt one or more characteristics of the plurality of satellite user beams for the one or more service periods. These techniques may allow for the maximization of capacity utilization to meet network demand where it is needed in the service area and during particular service periods.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
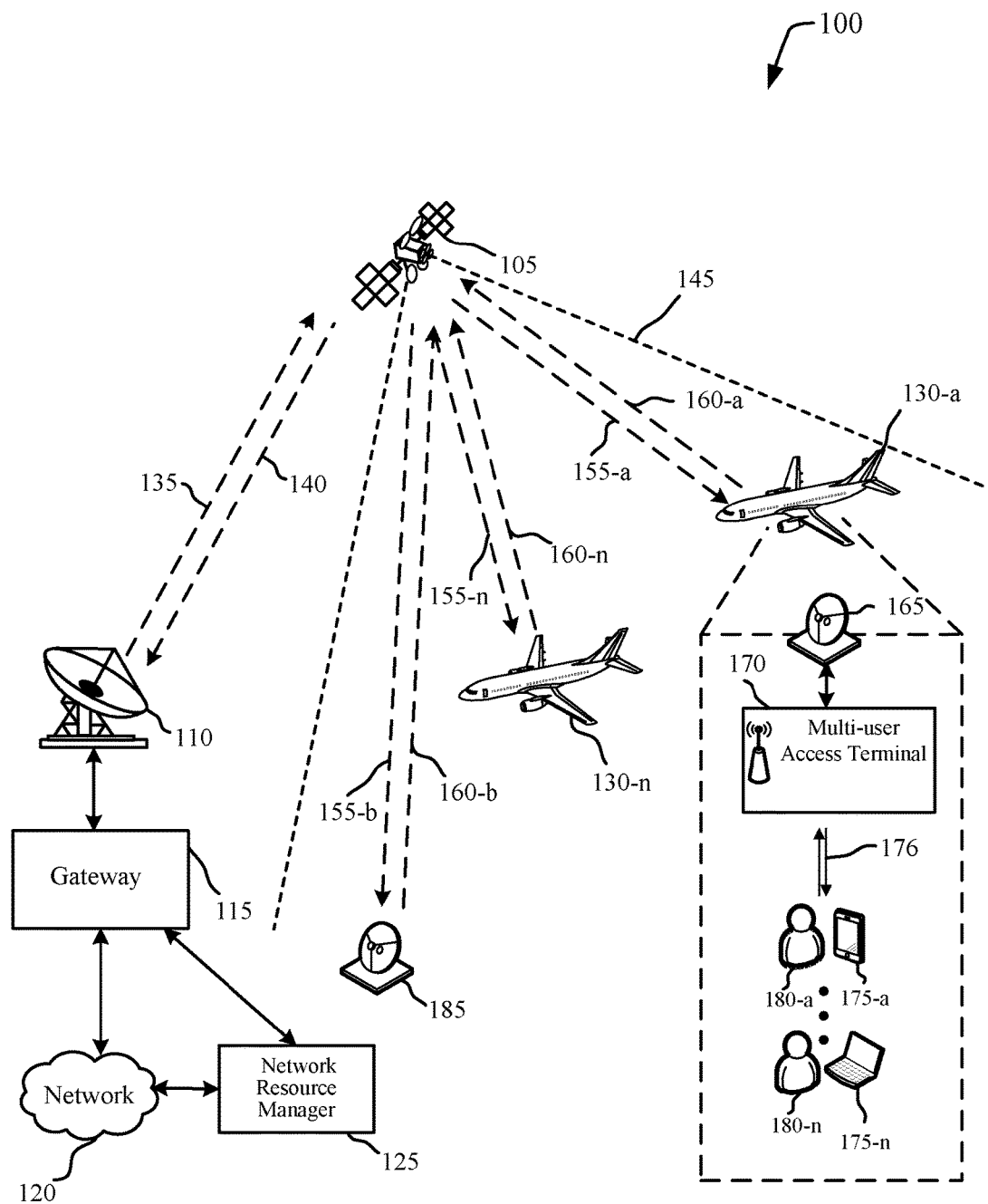
FIG. 1 is a simplified diagram of a satellite communications system in which the principles included herein may be described.

Increasingly, passengers on mobile vessels desire broadband network access while in transit. Mobile vessels may receive network access service via a communication link such as a satellite communications link. The mobile vessels may have an on-board multi-user access terminal that communicates with ground stations (e.g., via a satellite) of a communications system and provides network access connectivity for the passengers. For example, users may connect their communication devices (e.g., smartphones, laptops, tablets, etc.) to a wireless local area network (WLAN) served by the multi-user access terminal, which routes data communications to other networks (e.g., the Internet) via the communication link. Thus, a capacity of the communications link may be shared by the users via the multi-user access terminal.

The satellite communications system may be a multi-beam satellite system and the communication link may use resources of one of the satellite user beams at a given time. Each mobile vessel may represent a large number of users, all potentially accessing broadband content concurrently. For example, a cruise ship may have thousands of passengers, a large proportion of which may be accessing the Internet at a given time. In addition, vessels may rapidly move between satellite beams. For example, an aircraft may have hundreds of passengers and may traverse several satellite user beams in the span of a few hours. Thus, the communications system may experience significant variation in demand over time due to the movement of the mobile vessels. While resources of a given satellite user beam may be flexibly applied to service the mobile vessels currently within the satellite user beam, increasing capacity of a given satellite user beam presents challenges. Increasing bandwidth for wireless communications systems such that excess capacity for each user beam is available on-demand is expensive and sometimes additional usable spectrum is unavailable. In addition, where system resources the resources for increasing the capacity can be taken from without disrupting service currently using the resources.

The described features relate to dynamically allocating satellite capacity based on mobile vessel network load forecasting. The described allocation techniques may use predicted locations and predicted network demands to predict the spatial network resource demand over a service area and one or more service periods. The techniques may then allocate capacity between different service areas to match the predicted spatial network resource demand during the one or more service periods. These techniques allow for a satellite communications system to better utilize scarce network capacity for providing network service to mobile vessels.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 is a simplified diagram of a satellite communications system 100 in which the principles included herein may be described. The satellite communications system 100 may provide network access service to users 180 on-board mobile vessel 130-a. The network access service may be provided to the users 180 via a multi-user access terminal 170, to which users 180 may connect their communication devices 175 via wired (e.g., Ethernet) or wireless (e.g., WLAN) connections 176. The multi-user access terminal 170 may obtain the network access service via a user beam 145. The satellite communications system 100 is a multiple access system capable of providing network service for multiple mobile vessels 130 (e.g., mobile vessel 130-a, 130-n, etc.) and the network users 180 of each mobile vessel 130. It should be noted that although mobile vessels 130-a through 130-n are illustrated as aircraft and aircraft are used as examples in the description that follows, references to aircraft may also be any type of mobile vessel transporting multiple passengers such as buses, trains, ships, etc.

The satellite communications system 100 may include any suitable type of satellite system, including a geostationary satellite system, medium earth orbit (MEO), or low earth orbit (LEO) satellite system. Although only a single user beam 145 is illustrated, the satellite 105 may be a multi-beam satellite, transmitting a number (e.g., typically 20-500, etc.) of user beams 145 each directed at a different region of the earth. This can allow coverage of a relatively large geographical area and frequency re-use within the covered area. Frequency re-use in multi-beam satellite systems permits an increase in capacity of the system for a given system bandwidth. With such a multi-beam satellite, there may be a number of different signal switching configurations, allowing signals from a single gateway system 115 to be switched between different spot beams. Although illustrated as including one satellite 105, the satellite communications system 100 may include multiple satellites. The multiple satellites may have service coverage areas that at least partially overlap with each other The satellite communications system 100 includes a gateway system 115 and a network 120, which may be connected together via one or more wired or wireless links. The gateway system 115 is configured to communicate with one or more aircraft 130 via satellite 105. The network 120 may include any suitable public or private networks and may be connected to other communications networks (not shown) such as the Internet, telephony networks (e.g., Public Switched Telephone Network (PSTN), etc.), and the like. The network 120 may connect the gateway system 115 with other gateway systems, which may also be in communication with the satellite 105. Alternatively, a separate network linking gateways and other nodes may be employed to cooperatively service user traffic. Gateway system 115 may also be configured to receive return link signals from fixed terminals 185 and aircraft 130 (via the satellite 105) that are directed to a destination in the network 120 or the other communication networks.

The gateway system 115 may be a device or system that provides an interface between the network 120 and the satellite 105. The gateway system 115 may use an antenna 110 to transmit signals to and receive signals from the satellite 105 via a gateway uplink 135 and a gateway downlink 140. The antenna 110 may be two-way capable and designed with adequate transmit power and receive sensitivity to communicate reliably with the satellite 105. In one embodiment, satellite 105 is configured to receive signals from the antenna 110 within a specified frequency band and specific polarization.

The satellite communications system 100 also includes a network resource manager 125, which may be connected together via one or more wired or wireless links to gateway 115 and/or network 120. The network resource manager 125 may receive route path data for mobile vessels 130 that are being provided network access service by satellite communications system 100. For example, the route path data may be received for each of multiple aircraft 130, from a centralized database accessible via network 120, etc. The centralized database may include, for example, filed route plan information (e.g., flight paths filed with the Federal Aviation Administration (FAA), etc.), and may be supplemented with current status information (e.g., takeoff information, GPS coordinates, flight delays, etc.).

The route path data may include present route information, planned route information, or other path related information associated with the mobile vessels 130. For example, planned information can include origin and destination locations, and planned travel path, altitude, speed, etc. over the trip. Present information can include present (or last reported) location, altitude, speed, etc. Other path related information may include weather patterns or historical data from similar trips.

In some examples, the network resource manager 125 may predict the routes for some mobile vessels based on the planned and present information, and the other path related information associated with the mobile vessel routes. For example, the network resource manager 125 may predict the route path data based on origin and destination locations and data that may impact the route such as weather patterns or historical data from other similar trips. Some of these mobile vessels 130, and in turn the mobile multi-user terminals 170 within those particular mobile vessels, may not currently be provided network access service at the time the network resource manager 125 receives the route path data. Network resource manager 125 may forecast travel paths for the aircraft 130 based on the received route path data, and may in turn determine various service areas and service periods for providing the aircraft 130 network access service. The forecasted travel paths may be based on current location and route path data for aircraft 130 and may be recalculated based on changes in current location and/or route path data for one or more of the aircraft 130.

Network resource manager 125 may then predict a spatial network resource demand based on the predicted network demands for the multi-user access terminals 170 within a service area during one or more service periods. Based on the predicted spatial network resource demand, the network resource manager 125 may then determine a satellite capacity resource configuration for satellite user beams from satellite 105 for one or more service periods. The predicted spatial network resource demand and the determined satellite capacity resource configuration may be unique to each of the service periods.

With the determined satellite capacity resource configuration, the network resource manager 125 may use it to adapt one or more characteristics of the satellite user beams 145 for one or more service periods. The adapted characteristics may include beamforming parameters for at least one satellite user beam, a dwell time for at least one satellite user beam, a bandwidth for at least one satellite user beam, a coverage area change, or combinations of these characteristics. In adjusting a bandwidth for at least one satellite user beam, network resource manager 125 may signal gateway 115 to send a transmission to satellite 105 via antenna 110 to vary the bandwidth of one or more satellite user beams based on a change of spatial network resource demand. In regards to adjusting dwell times, network resource manager 125 may provide an indication to gateway 115 to switch signals to various satellite user beams via satellite 105. For adjusting the beamforming parameters, network resource manager 125 may provide signals to gateway 115 which are in turn sent to satellite 105 for application to signals transmitted and/or received by the satellite 105. These signals may take the form of beamforming coefficients, which paired with beamforming techniques known in the art, enable satellite 105 to direct satellite user beams in a manner that provides capacity adapted to the predicted spatial network resource demand. In some examples, dwell times may be adjusted by switching between different sets of beamforming parameters.

The ability to shift network resources is sometimes limited, however. In such cases, the forecast of the demand pattern can be used to "smooth" the demand peaks by limiting the capacity allocations to users in a systematic way. For example, bulk users can be restricted to minimal (or no) capacity allocation, regular users can be given reduced allocation, and premium users can be spared of all restrictions based on a service level agreement of each class of user. This approach is particularly pertinent to the case of video traffic which can be sent with varying data rates (and corresponding varying quality). Expecting a surge in demand, the network can reduce the capacity allocated to a new video connection (e.g., for a bulk or regular user), thus saving the capacity for more users down the line.

Each satellite user beam 145 of the satellite 105 supports the aircraft 130 within its coverage area (e.g., providing uplink and downlink resources). Frequency re-use between satellite user beams 145 may be provided by assigning one, or more, ranges of frequencies (which may be referred to as channels) to each satellite user beam 145 and/or by use of orthogonal polarizations. A particular frequency range and/or polarization may be called a "color," and frequency re-use in a tiled spot beam satellite system may be according to color. The coverage of different satellite user beams 145 may be non-overlapping or have varying measures of overlap. In one embodiment, satellite user beams 145 of the satellite 105 may be tiled and partially overlapping to provide complete or almost complete coverage for a relatively large geographical area where partially overlapping or adjacent beams use different ranges of frequencies and/or polarizations (e.g., different colors).

The multi-user access terminal 170 may use an antenna 165 mounted on aircraft 130-*a* to communicate signals with the satellite 105 via a user beam downlink 155-*a* and user beam uplink 160-*a*. The antenna 165 may be mounted to an elevation and azimuth gimbal which points the antenna 165 (e.g., actively tracking) at satellite 105. The satellite communications system 100 may operate in the International Telecommunications Union (ITU) Ku, K, or Ka-bands (for example from 17.7 to 21.2 Giga-Hertz (GHz) in the downlink and 27.5 to 31 GHz in the uplink portion of the Ka-band). Alternatively, satellite communications system 100 may operate in other frequency bands such as C-band, X-band, S-band, L-band, and the like.

In satellite communication system 100, users 180-*a* to 180-*n* may utilize the network access service via mobile devices 175. Each user 180-*a* to 180-*n* may be provided service via the satellite communication system 100 by connecting (e.g., via a wired or wireless connection) a mobile device 175 (e.g., desktop computer, laptop, set-top box, smartphone, tablet, Internet-enabled television, and the like) to the multi-user access terminal 170. As illustrated in FIG. 1, mobile devices 175-*a* to 175-*n* are connected via wired or wireless connections 176 (e.g., Wi-Fi, Ethernet, etc.) to multi-user access terminal 170. Multi-user access terminal 170 may receive data from satellite 105 via user beam downlink 155-*a* and transmit data to satellite 105 via user beam uplink 160-*a*. Other aircraft within the user beam 145 such as aircraft 130-*n* may receive data from satellite 105 via user beam downlink 155-*n* and transmit data to satellite 105 via user beam uplink 160-*n*. While satellite communication system 100 is illustrated providing mobile network access service to mobile users 180 aboard aircraft 130, it can be appreciated that the principles described herein for providing network access service to mobile users may be provided using multi-user access terminals positioned in fixed locations or on various modes of transportation where multiple mobile users may desire network access via satellite communications system 100 (e.g., trains, boats, busses, etc.).

In some embodiments, the predicted network demand includes both a predicted return link (e.g., via user beam uplink 160 and gateway downlink 140) utilization of a mobile vessel 130 (e.g., an aircraft) and a predicted forward link (e.g., via gateway uplink 135 and user beam downlink 155) utilization. In embodiments in which the satellite can dynamically allocate capacity among the forward and return links, the predicted return and forward link utilizations may be used to determine this dynamic allocation. In other embodiments in which the capacity is not dynamically allocated among the forward and return links, the predicted demand may be the predicted forward link utilization of the aircraft, since the forward link data downloaded by passengers (e.g., content such as videos, web pages, etc.) is typically much greater than the return link data uploaded (e.g., requests for content) by passengers.

Each satellite user beam 145 of the satellite 105 may also support a number of fixed terminals 185. Fixed terminal 185 may receive data from satellite 105 via user beam downlink 155-*b* and transmit data via user beam uplink 160-*b*. Fixed terminal 185 may be any two-way satellite ground station such as a very small aperture terminal (VSAT). Fixed terminal 185 may provide services to subscribers such as data, voice, and video signals. Each fixed terminal may typically provide service to a small number of users (e.g., a residence or business). Network resource demands from fixed terminals may be predicted relatively accurately based on the time of day in the service area that the fixed terminals are located in. For example, network resource demands from fixed terminals in residential areas may be greater during the evening than during the day. Therefore, dynamic allocation of satellite capacity may be based on the aggregate of a predicted network resource demand from fixed terminals and the predicted network resource demand from mobile vessels in a particular service area over a particular time.

Figure 2:
FIG. 2 is an example diagram of a service area with example routes in accordance with various aspects of the present disclosure.

FIG. 2 is an example diagram of a service area 200 including the continental United States, showing major U.S. cities with large amounts of airline passenger traffic, and major airline route paths. Mobile vessels such as aircraft may be transporting hundreds of passengers during a flight, and a number of those passengers may be utilizing network services on the aircraft. Due to the large number of passengers, the network resource demands for a particular aircraft may be significant. Additionally, during an average day in the U.S., there may be tens of thousands of flights in the air at a particular moment. Coupled with the relatively high rate of speed of the aircraft, the network resource demands within a particular geographic area may vary significantly over a relatively short period of time as various aircraft enter and leave that particular geographic area. Additionally due to the vast size of the U.S., a geographic area on one end of the country may experience surges of network resource demand at different times than a geographic area on the other end of the country due to differing time zones. For example, the Eastern U.S. may experience greater network demand earlier in the day while the West Coast of the U.S. may experience greater network resource demand during the night on the East Coast because of late arrivals on the West Coast and red-eye flights commencing towards the East Coast.

Service area 200 depicts various U.S. cities, including New York City 205 and Los Angeles 210. The airline route path 215 between New York City 205 and Los Angeles 210 is one of the busiest air routes in the continental U.S. with thousands of passengers flying the route every day. With flights that originate in New York City 205, the passengers flying to Los Angeles 210 fly over various parts of the country including portions of the East Coast, the Midwest, the Great Plains, the Rocky Mountains, and the Southwest. An aircraft flying route path 215 requires network access service over different portions of service area 200 over different periods of time. Additionally, due to the asymmetry of network resource demand largely due to population and time differences, satellite resources may be stressed in certain regions at certain times of day.

Figure 3:
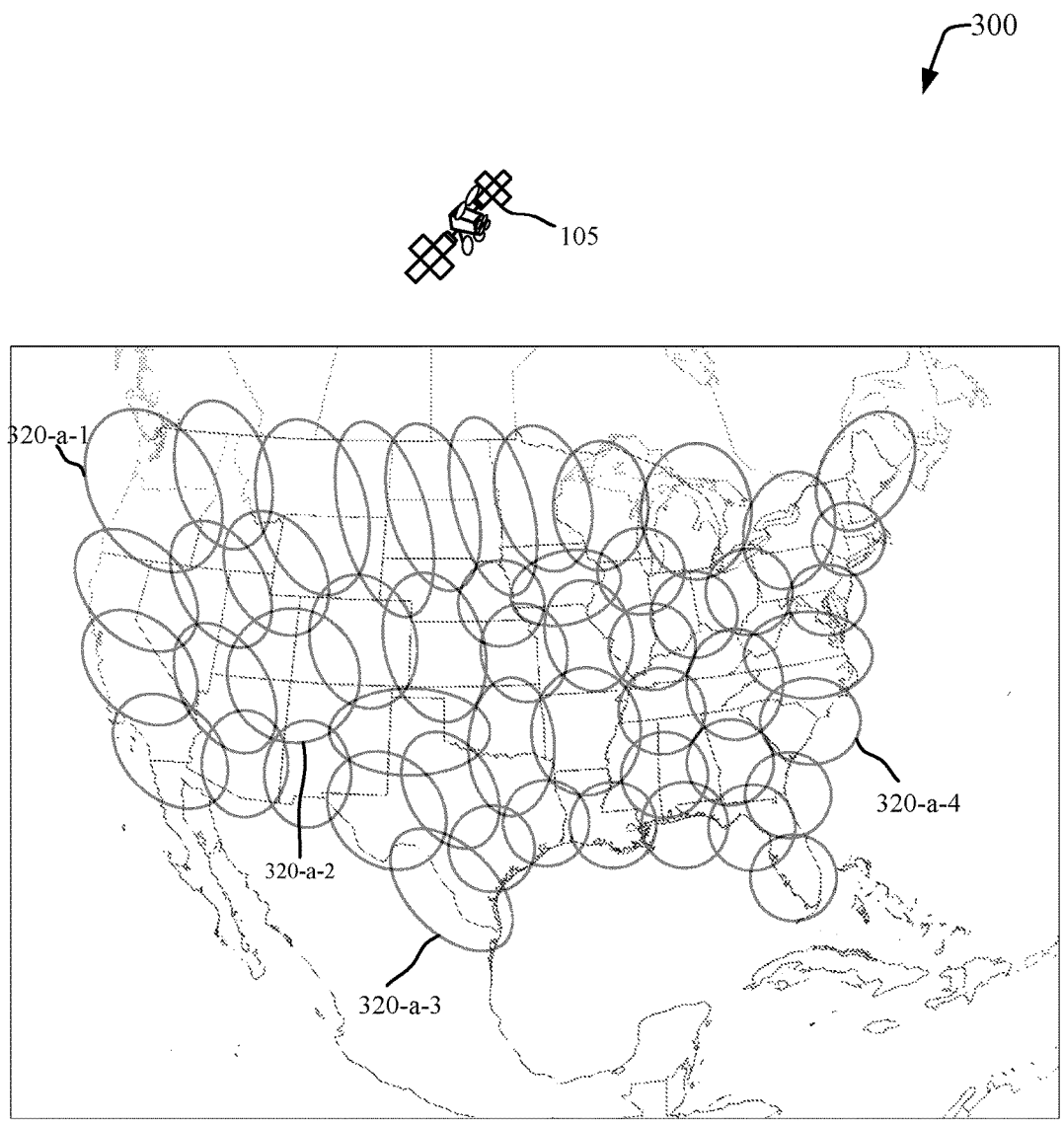
FIG. 3 is an example diagram of a satellite user beam configuration of satellite user beams across a geographic area, in accordance with various aspects of the present disclosure.

FIG. 3 is an example diagram of a satellite user beam configuration 300 of satellite user beams across a geographic area. The geographic area may have multiple aircraft flying or scheduled to fly through the service area. Additionally, the geographic area may include fixed terminals. Satellite 105 may provide network coverage to the geographic area with satellite user beams in accordance with various aspects of the present disclosure. The illustrated geographic area may be a region within an overall service area of satellite 105. Satellite 105 may use a particular system bandwidth and have multiple satellite user beams, such as satellite user beams 320-*a*-1, 320-*a*-2, 320-*a*-3, and 320-*a*-4 (shown by their associated user beam coverage areas). The satellite user beams 320-*a* may each use portions of the system bandwidth and a polarization direction (e.g., allocated by color). The satellite user beams may use frequency re-use schemes in order to minimize interference and maximize spectral efficiency. The coverage areas for satellite user beams may be different sizes and/or dimensions for various reasons such as satellite azimuth, frequency, or intentional beam-shaping techniques (e.g., shaped antenna systems, beamforming, etc.). Each satellite user beam 320-*a* may service any combination of fixed terminals and aircraft within its user beam coverage area.

Satellite 105 may be a part of various types of satellite systems. For example, satellite 105 may utilize a fixed beam architecture where the satellite user beams may each be intentionally fixed on particular geographic areas. A fixed beam refers to a spot beam for which the angular beamwidth and coverage area does not intentionally vary with time. Geostationary satellites often use fixed beams. In some examples, user beam coverage areas of adjacent satellite user beams in a fixed beam system may be partially overlapping to provide continuous coverage, and adjacent satellite user beams 320-*a* use different ranges of frequencies and/or polarizations (e.g., colors). For example, a fixed beam system may employ a four-color frequency re-use pattern where adjacent satellite user beams 320-*a* use a different beam color. These four colors may be split into two different frequency ranges and two orthogonal polarizations (e.g., horizontal and vertical, left-hand circularly polarized (LHCP) and right-hand circularly polarized (RHCP), etc.). Adjacent beams using the same or overlapping bandwidth ranges may have overlapping coverage areas if their polarizations are orthogonal. Likewise, beams using colors of the same polarization may have overlapping beam coverage areas if they do not overlap in frequency. Generally, fixed beam systems use at least four colors (e.g., 4, 5, 6, 7 or more colors) to provide contiguous coverage. Alternatively, some adjacent or overlapping satellite user beams 320-*a* may use the same resources (the same frequency range and polarization), with interference mitigated within the overlapping regions using interference mitigation techniques such as adaptive coding and modulation (ACM), interference cancellation, space-time coding, and the like.

Alternatively, Satellite 105 may be part of a satellite system that uses a non-fixed beam architecture such as a beamforming architecture. In a beamforming satellite system, signals for each user beam may be transmitted from multiple antenna elements on the satellite, with beamforming coefficients applied to control the signal phase and amplitude so that the energy transmitted by the antenna elements will constructively superpose at a desired location. Similarly, beamforming coefficients may be applied to signals received from satellite terminals so that energy received from terminals within a particular user beam coverage area constructively superposes. In some examples, satellite 105 may apply beamforming coefficients to signals communicated via the satellite 105 to control user beam coverage areas (e.g., on-board beamforming (OBBF)). Gateway system 115 may send the beamforming coefficients to the satellite 105 to be applied at the satellite 105. In other examples, beamforming coefficients may be applied at gateway(s) 115 such that the signals transmitted by the satellite will be beamformed (e.g., ground-based beamforming (GBBF)). In some examples, each satellite user beam in a beamforming system may be partially overlapping with one or more adjacent beams where beams having overlapping beam coverage areas use different colors. For example, a beamforming system may utilize a four-color frequency re-use pattern where adjacent satellite user beams use a different beam color. These four colors may be in a configuration where they are split into two different frequency ranges and two different polarizations. In some examples, fewer than four or more than four colors may be used. For example, some adjacent or overlapping satellite user beams 320-a may use the same resources (the same frequency range and polarization), with interference mitigated within the overlapping regions using interference mitigation techniques such as ACM, interference cancellation, space-time coding, and the like.

In some examples, satellite 105 may be a part of a beam switching satellite system. Satellite 105 may utilize a number of different signal switching configurations, allowing signals from gateway system 115 to be switched between different satellite user beams 320-a. This system allows for particular satellite user beams, that would otherwise overlap in coverage area and frequency with each other, to remain orthogonal in time. In some examples, a satellite user beam in a switching satellite system may have a beam coverage area that partially overlaps with the beam coverage area of one or more adjacent beams, where overlapping beams that use the same or overlapping frequency ranges are orthogonal to each other in time. Although the switching satellite system may utilize a frequency re-use pattern using beam colors, beam switching satellite systems may use fewer colors than traditional fixed beam systems. For example, a beam switching satellite system may utilize a two-color frequency re-use pattern where each color spans a system bandwidth using orthogonal polarizations.

In a certain service period, a particular satellite user beam may experience an influx of multiple aircraft into its user beam coverage area (in addition to any fixed terminals 185 within the user beam coverage area). As more aircraft enter into a coverage area associated with a particular satellite user beam, the network demand for the beam may increase substantially. Each satellite user beam of satellite 105 may have an allocated capacity determined by a beam bandwidth and power budget so it may be the case that the capacity of the satellite user beam will be exceeded for some period of time. Additionally it may be difficult to make adjustments to the satellite user beams frequently or on an immediate basis. For example, there may be an associated overhead in reconfiguring fixed terminals in the service area for different frequency ranges and/or polarizations due to any changes in the servicing beam. Thus, it may be advantageous to determine from forecasted route paths which satellite user beams will encounter increased or decreased network demand for not only a present service period, but also for one or more service periods into the future. Various techniques for adapting or providing resources to satellite user beams which may encounter increased network demand may include beamforming, reallocating bandwidth, and adjusting dwell time.

Figure 4A:
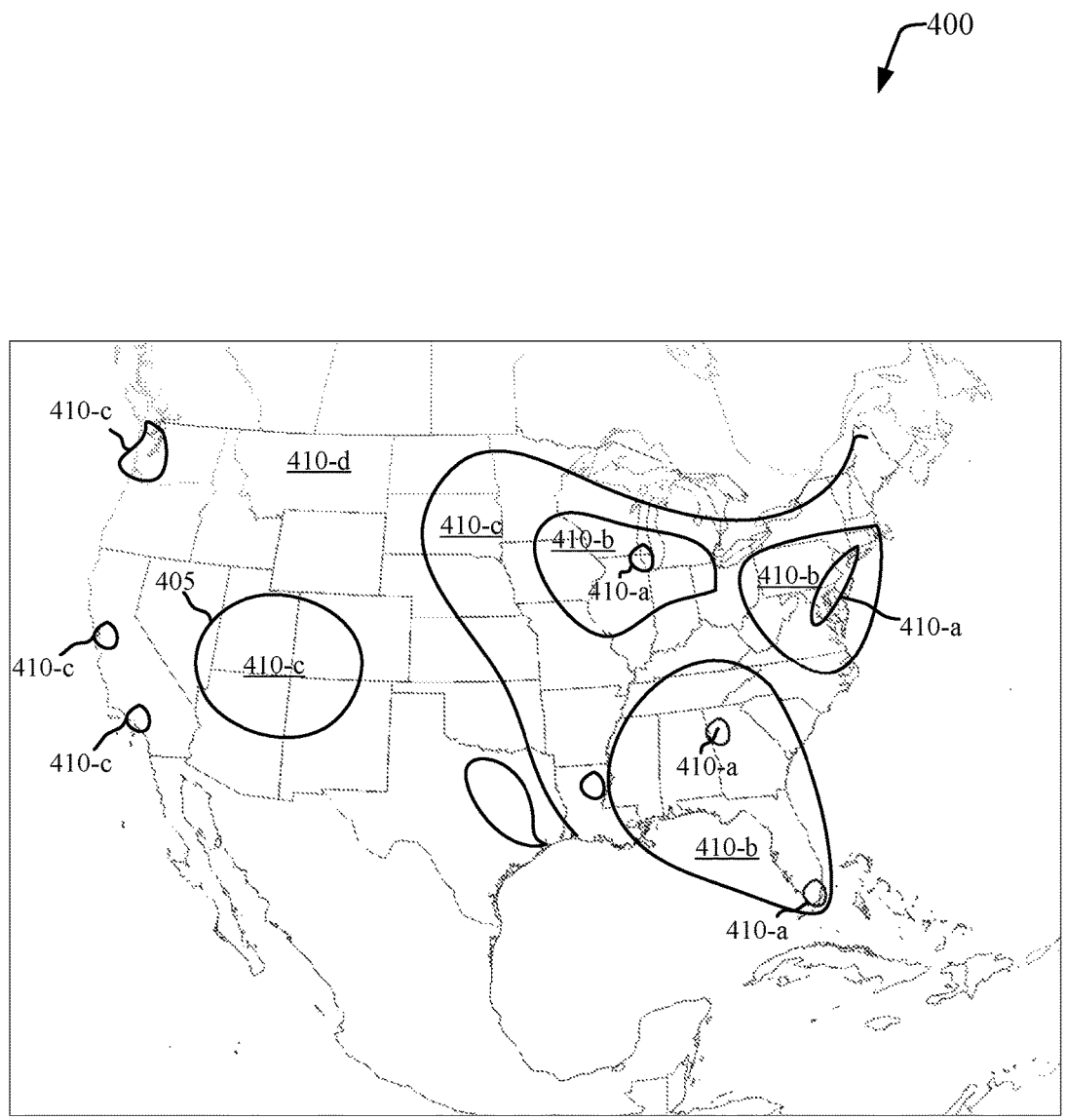
FIGS. 4A and 4B are contour diagrams of predicted spatial network resource demand for an example future service period, in accordance with various aspects of the present disclosure.

FIG. 4A is a contour diagram 400 of predicted spatial network resource demand for an example future service period, in accordance with various aspects of the present disclosure. FIG. 4A may reflect, for example, predicted spatial network resource demand for the aircraft and fixed terminals in the service area of FIG. 3 over a particular service period. The predicted spatial network resource demand for the fixed terminals may be based on historical network usage (e.g., accounting for time of day, day of week, etc.). The predicted spatial network resource demand for the aircraft may be based from historical network usage data based on origin and/or destination locations, departure and/or arrival times, time of day, day of the week, number of passengers on the aircraft, number of personal electronic devices within the aircraft, aircraft type, network service plans that are offered to passengers, etc. For example, a predicted service demand for each aircraft may be estimated based on a number of passengers on the aircraft or scheduled to be on the aircraft. The predicted service demand for each aircraft may reflect, for example, an estimated typical information rate based on historical usage data for aircraft passengers and the number of passengers, or an estimated minimum information rate (minIR), committed information rate (CIR), or peak information rate (PIR) based on the service plan minIR, CIR, or PIR offered to passengers and the number of passengers.

The predicted spatial network resource demand may also reflect a filtered (e.g., spatially or temporally) network resource demand over a period of time. For example, contour diagram 400 may illustrate average predicted network resource demand for a particular service period. In another example, contour diagram 400 may illustrate a maximum predicted network resource demand (or highest predicted network resource demand lasting longer than a particular time threshold) for a particular service period. The predicted network resource demand may be determined, in part, from a series of forecasted travel paths of aircraft.

The service periods may be semi-statically or dynamically determined. Contour diagram 400 may reflect the predicted network resource demand of primetime hours (e.g., 6-9 pm) on the East Coast. Primetime hours may be the time frame where predicted network resource demand is at its peak in a given area. Thus contour diagram 400 may illustrate predicted network resource demand where the demand on the East Coast is at or near its peak, while demand on the West Coast is below its peak.

The contour lines 405 depict various levels of predicted network resource demand in a particular region of a service area. In contour diagram 400, areas within the contour lines 405 defining areas 410-a have a high level of predicted network resource demand relative to other areas depicted in contour diagram 400. In contrast, areas 410-d have a low level of predicted network resource demand relative to other areas depicted in contour diagram 400. Areas 410-b and 410-c may depict intermediate levels of predicted network resource demand. The predicted network resource demand in areas 410-a could be influenced by a variety of factors including the number of fixed terminals in the area and/or one or more forecasted travel paths of aircraft being provided network access service via the satellite system passing through areas 410-a within the service period. In such examples where predicted network resource demand may exceed current network resources assigned to an area, various techniques for apportioning satellite network resources may be employed. These techniques may include reallocating bandwidth, modifying beamforming of user beams, and/or adjusting dwell times for beam switching.

Figure 4B:
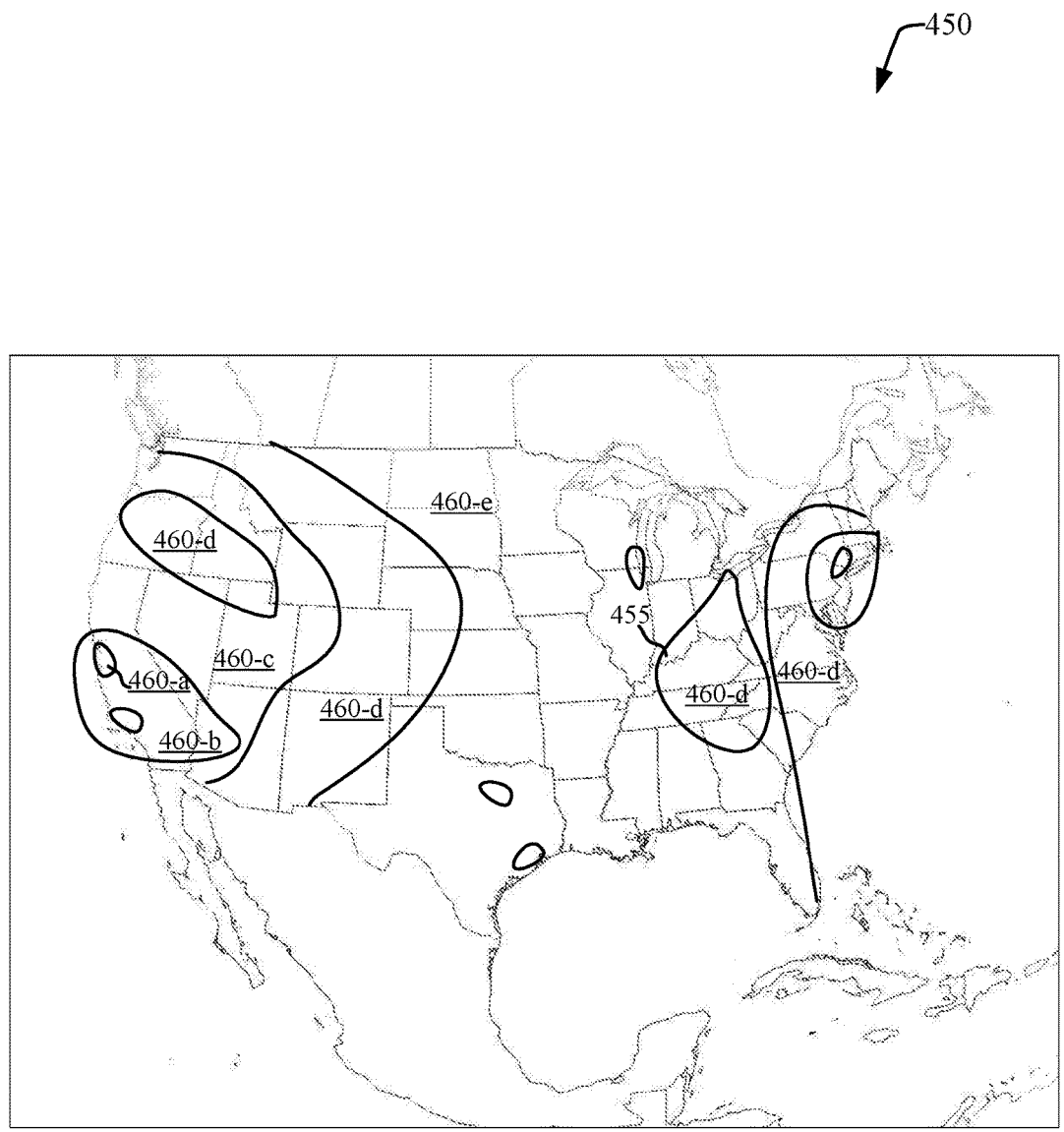

FIG. 4B is a contour diagram 450 of predicted spatial network resource demand for an example future service period, in accordance with various aspects of the present disclosure. FIG. 4B may reflect, for example, predicted spatial network resource demand for the aircraft and fixed terminals in a service area during primetime hours on the West Coast.

The contour lines 455 depict various levels of predicted network resource demand in a particular region of a service area. In contour diagram 450, areas within the contour lines 455 defining areas 460-a have a high level of predicted network resource demand relative to other areas depicted in contour diagram 450. In contrast, areas 460-d have a low level of predicted network resource demand relative to other areas depicted in contour diagram 450. Areas 460-b and 460-c may depict intermediate levels of predicted network resource demand.

Contour diagram 450 is similar in many respects to contour diagram 400. However, predicted network resource demand contour lines 455 are different from contour lines 405 in contour diagram 400 because contour diagram 450 shows predicted network resource demand during a time period (e.g., primetime hours) on the West Coast. For example, in contour diagram 450 many people on the East Coast may be reducing their network usage because their flights have already landed, people are getting ready to sleep or are already asleep, etc. In contrast, on the West Coast more flights may still be in route during the time period for contour diagram 450 and many people may still be using network access service both in the air and on the ground.

Figure 5A:
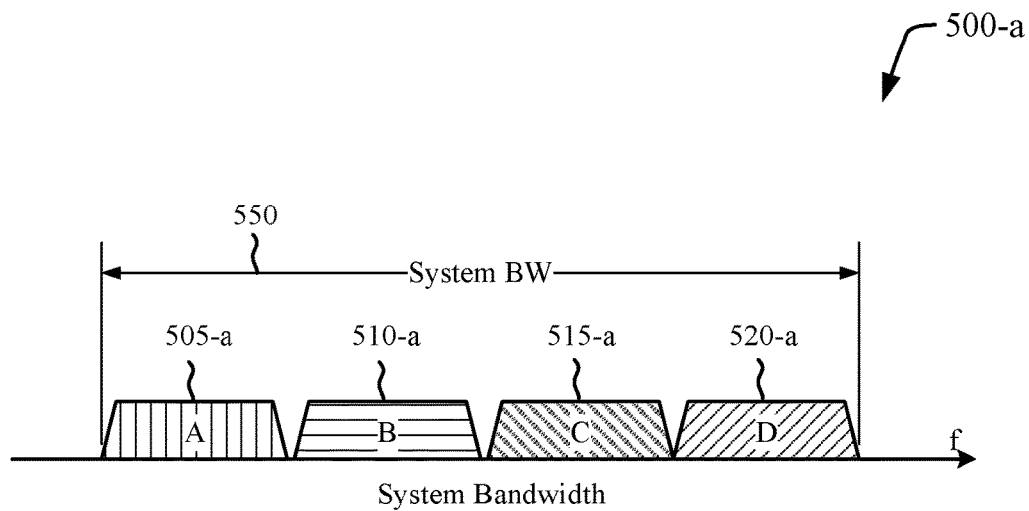
FIGS. 5A and 5B are simplified diagrams illustrating an example of re-allocating system bandwidth among satellite user beams to dynamically allocate satellite network resource capacity based on network load forecasting, in accordance with various aspects of the present disclosure.
Figure 5B:
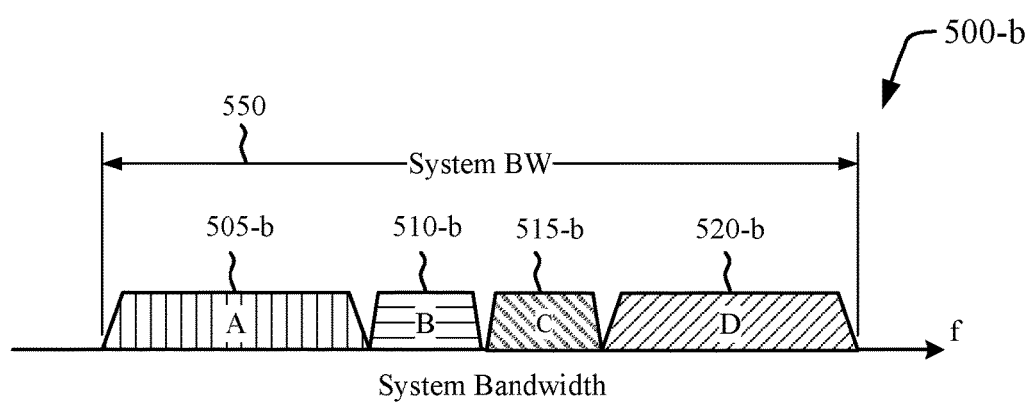

FIGS. 5A and 5B are simplified diagrams illustrating an example of re-allocating system bandwidth among satellite user beams to dynamically allocate satellite network resource capacity based on network load forecasting, in accordance with various aspects of the present disclosure. The techniques of FIGS. 5A and 5B may be employed, for example, in a fixed satellite beam system in order to dynamically allocate satellite network resource capacity based on network load forecasting.

FIG. 5A depicts a system bandwidth allocation 500-a which, referring back to FIG. 3, may be deployed by satellite 105 for the depicted service area. System bandwidth 550 of FIG. 4A may be a portion of frequency spectrum in which a satellite 105 may normally operate in (e.g., Ka, Ku, etc.). In one example, each satellite user beam for a fixed beam satellite may operate in one of beam colors A, B, C, or D. Although illustrated as different ranges within a system bandwidth 550, beam colors A, B, C, and D may each correspond to a combination of frequency and polarization resources, as described above.

FIG. 5A depicts that beam colors A, B, C, and D are allocated to beam allocations 505-a, 510-a, 515-a, and 520-a, respectively. In this example, each beam color occupies a substantially equal portion of system bandwidth 550. Satellite user beams that spatially overlap other satellite user beams do not share bandwidth resources using resource allocation 500-a of FIG. 5A.

FIG. 5B depicts an example system bandwidth allocation 500-b where the beam allocations for beam colors A, B, C, and D have been adapted to beam allocations 505-b, 510-b, 515-b, and 520-b of system bandwidth 550, respectively. In this example, resource allocations for beam colors A, B, C, and D may have been adjusted from resource allocation 500-a based on predicted network demand. For example, the spatial network resource demand may be predicted for each user beam coverage area of the satellite user beams of FIG. 3. Using contour diagrams 400 as an example, network resource manager 125 may have predicted a spatial network resource demand such that in order to best fulfill the network demand in area 410-a, satellite 105 may increase the bandwidth resources available to the satellite user beam(s) servicing area(s) 410-a in order to increase their throughput, while reducing the bandwidth resources available to some or all user beams having overlapping user beam coverage areas. In this case, not all user beams necessarily use the same set of beam colors. For example, in some areas (e.g., outside of high demand areas), adjacent user beams may use beam allocations 505-a, 510-a, 515-a, or 520-a while in other areas adjacent user beams may use beam allocations 505-b, 510-b, 515-b, or 520-b.

In resource allocation 500-b, the bandwidth resources made available to beam colors A and D have been increased while the bandwidth resources made available to beam colors B and C have been decreased. It may be the case that the predicted spatial network resource demand will vary between each of multiple service periods and that the bandwidth allocation may change for each of the satellite user beams for each of the service periods.

As discussed above, re-allocation of the system bandwidth among beam colors may involve re-configuring one or more fixed terminals 185 or multi-user access terminals 170 for the adapted system bandwidth allocation. For example, one or more fixed terminals may be switched to use a different bandwidth or polarization direction for the service period using the adapted system bandwidth allocation. This re-configuration may include sending updated configuration parameters to the one or more fixed terminals 185 or multi-user access terminals 170 prior to the service period, with an indication of when the updated configuration parameters are to be used for communications. In some examples, beam transmission power (e.g., beam equivalent isotropically radiated power (EIRP), etc.) may be reallocated in addition to the system bandwidth. For example, a multi-beam satellite may have a certain power budget and some power may be reallocated from user beams having a lower predicted demand to user beams predicted to have a greater demand during a service period. The higher EIRP may increase the signal to noise ratio (SNR) experienced by terminals (e.g., fixed user terminals and mobile multi-user terminals), which may be used to increase the effective data rate to the terminals serviced by the user beam. As described above, where the limits of shifting capacity using re-allocation of the system bandwidth and transmission power are exceeded, the predicted spatial network resource demand may be used to smooth demand peaks by applying restrictions prior to a peak demand being reached.

Figure 6:
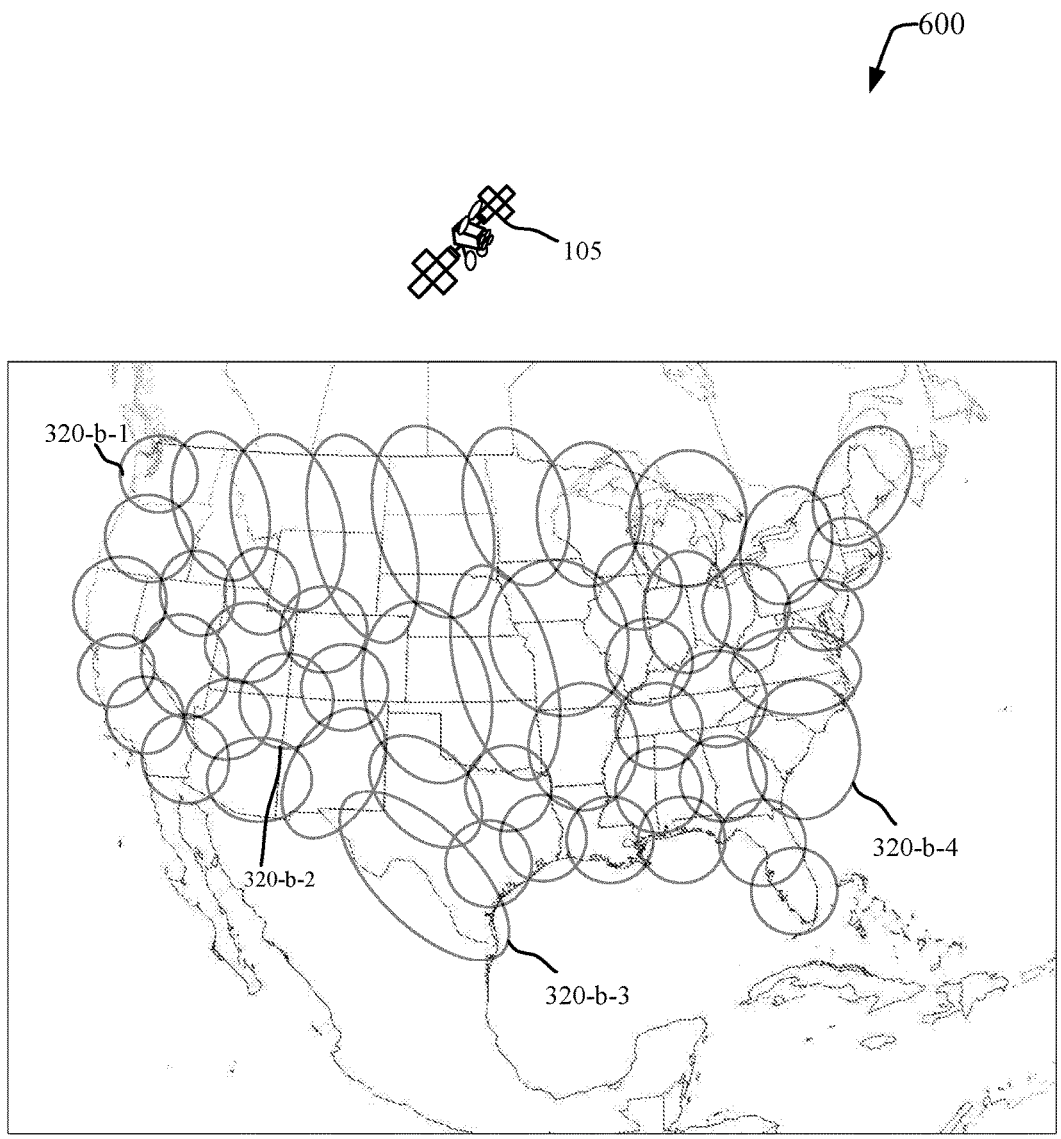
FIG. 6 is an example diagram of modified beamforming of satellite user beams to dynamically allocate satellite network resource capacity based on network load forecasting, in accordance with various aspects of the present disclosure.

In a beamforming satellite system, apportioning satellite network resources in response to predicted spatial network resource demand may include modifying beamforming for user beams. FIG. 6 is an example diagram 600 of modified beamforming of satellite user beams to dynamically allocate satellite network resource capacity based on network load forecasting, in accordance with various aspects of the present disclosure. Diagram 600 may illustrate, for example, adjusting of beamformed user beams for the same service area shown in diagram 300 of FIG. 3 based on network load forecasting. In this example, satellite user beams 320-b-1, 320-b-2, 320-b-3, and 320-b-4 (illustrated by their associated user beam coverage areas) have been adjusted relative to satellite user beams 320-a-1, 320-a-2, 320-a-3, and 320-a-4, respectively, illustrated in FIG. 3 based on predicted network demand.

Diagram 600 may depict satellite user beams that have been adjusted via beamforming in order to tailor the network resources of satellite 105 toward areas exhibiting increased predicted spatial network resource demand relative to the service period shown in FIG. 3. Satellite user beam 320-*b*-4 may represent a satellite user beam having a coverage area in the Eastern time zone, satellite user beam 320-*b*-3 may represent a satellite user beam having a coverage area in the Central time zone, satellite user beam 320-*b*-2 may represent a satellite user beam having a coverage area in the Mountain time zone, and satellite user beam 320-*b*-1 may represent a satellite user beam having a coverage area in the Pacific time zone.

Diagram 600 may depict the U.S. during primetime hours on the West Coast whereas FIG. 3 may depict the U.S. during primetime hours on the East Coast. As explained above, the West Coast may experience increased network access demand at different times than the East Coast. Contrasting with FIG. 3, satellite user beams 320-*b* in diagram 600 are more tightly concentrated on areas on the West Coast than were satellite user beams 320-*a* in FIG. 3. Because satellite user beams 320-*b*-4 and 320-*b*-3 have coverage areas in portions of the U.S. that have a later local time (e.g., past primetime hours), they may experience lower network access demand relative to time zones west of them. Consequently, satellite user beams 320-*b*-4 and 320-*b*-3 may be beamformed such that their coverage areas are increased relative to satellite user beams 320-*a*-4 and 320-*a*-3, respectively. Also, because satellite user beams 320-*b*-2 and 320-*b*-1 have coverage areas in portions of the U.S. that are in primetime hours for the time period in which the beamforming shown in FIG. 6 is deployed, they may experience relatively higher network access demand. Consequently, satellite user beams 320-*b*-2 and 320-*b*-1 may be beamformed such that their coverage areas are decreased relative to satellite user beams 320-*a*-2 and 320-*a*-1, respectively. In addition to changing relative sizes of satellite user beams, various satellite user beams may be shifted to different geographic areas to reflect increasing and decreasing network demands. Additionally or alternatively, more or fewer beams may be formed in various areas. For example, additional beams may be added via beamforming in areas of higher predicted spatial network resource demand.

Network resource manager 125 may determine a satellite capacity resource configuration for the satellite user beams over one or more service periods based on the predicted spatial network resource demand for the service area. This satellite capacity resource configuration may be a series of parameters which are sent to satellite 105 for application to signals transmitted and/or received by the satellite 105. These signals may instruct satellite 105 on how to adapt satellite user beams to better provide network coverage to the aircraft 130 along their forecasted travel paths. These signals may take the form of beamforming coefficients, which paired with beamforming techniques known in the art, enable satellite 105 to direct satellite user beams in a manner that provides capacity adapted to the predicted spatial network resource demand. Additionally or alternatively, beamforming coefficients may be applied at a gateway system 115 such that the signals transmitted by the satellite will be beamformed.

As with re-allocation of system bandwidth, some fixed terminals and/or multi-user access terminals 170 may be switched from service via one user beam to another user beam when the user beam coverage areas for beamformed user beams are adjusted. Thus, adapting a satellite capacity resource configuration by modifying beamforming coefficients may include re-configuring one or more fixed terminals 185 or multi-user access terminals 170 for the adapted beamformed user beams. For example, one or more fixed terminals may be switched to use a different bandwidth or polarization direction for the service period. This re-configuration may include sending updated configuration parameters to the one or more fixed terminals 185 or multi-user access terminals 170 prior to the service period, with an indication of when the updated configuration parameters are to be used for communications. In some examples, adjusting beamforming may also require adjusting the satellite pathways. For example, coupling between user beam signal pathways and beamformers, or between beamformers and antenna elements may be adjusted to provide different combinations of satellite pathways from user beam signal pathways to antenna elements. As described above, where the limits of shifting capacity using beamforming are exceeded, the predicted spatial network resource demand may be used to smooth demand peaks by applying restrictions prior to a peak demand being reached.

Figure 7:
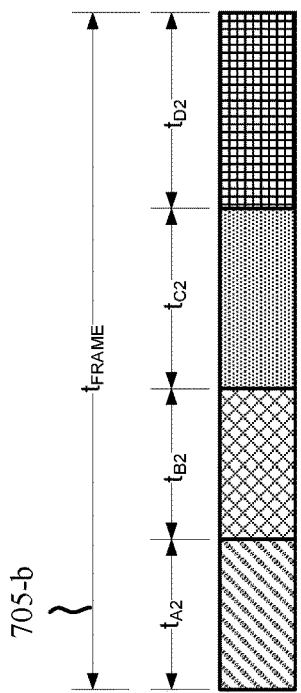
FIG. 7 is a simplified timing diagram illustrating an example of adapting dwell times to dynamically allocate satellite network resource capacity based on network load forecasting, in accordance with various aspects of the present disclosure.
Figure 7:
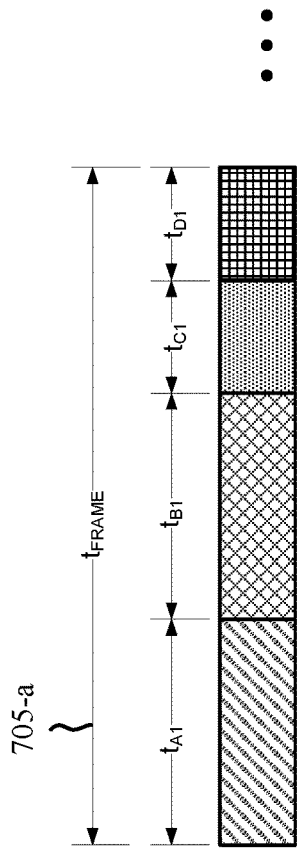

For a satellite system employing beam switching, apportioning satellite network resources in response to predicted spatial network resource demand may include adapting dwell times for beam switching. FIG. 7 is a simplified timing diagram 700 illustrating an example of adapting dwell times to dynamically allocate satellite network resource capacity based on network load forecasting, in accordance with various aspects of the present disclosure. Timing diagram 700 may be associated with the use of a multi-beam satellite system employing beam switching of user beams. FIG. 7 depicts a frame 705-*a* having dwell times $t_{A1}$, $t_{B1}$, $t_{C1}$, and $t_{D1}$ and frame 705-*b* having dwell times $t_{A2}$, $t_{B2}$, $t_{C2}$, and $t_{D2}$. A service period may correspond to a number of contiguous frames. Although the dwell times depicted in frame 705-*a* are contiguous, they may also not be contiguous.

During frame 705-*a*, gateway system 115 may continuously transmit a signal to a satellite 105 over a first frequency band having a given bandwidth. The satellite may be a switching bent pipe satellite that may upconvert or downconvert the signal to a second, different frequency band of the same bandwidth for relay to terminals in user beams. Then satellite 105 may switch the signal to various satellite user beams, each satellite user beam using all of the given bandwidth during its assigned dwell time. For example, the satellite may switch the signal to a first satellite user beam during dwell time $t_{A1}$. After dwell time $t_{A1}$, the signal may be switched to a second satellite user beam, which then occupies the bandwidth during dwell time period $t_{B1}$. The signal may also then be switched to a third and a fourth satellite user beam during dwell time periods $t_{C1}$, and $t_{D1}$, respectively.

Between frame 705-*a* and 705-*b*, network resource manager 125 may have predicted a spatial network resource demand for a future service period in which more capacity resources are desired for the third and fourth satellite user beams. In order to improve capacity allocation across the service area, the dwell times for each of the satellite user beams are adjusted for the service period. Frame 705-*b* shows the adjusted dwell times for a frame of the service period, with increased time resources for dwell times $t_{C2}$, and $t_{D2}$ relative to $t_{C1}$, and $t_{D1}$, and decreased time resources for dwell times $t_{A2}$, and $t_{B2}$ relative to $t_{A1}$, and $t_{B1}$ of frame 705-*a*. Although discussed with reference to forward link communications from the gateway(s) 115 to the terminals via the satellite 105, beam switching and adaptation of dwell times based on forecasted network load may also be used for return link communications. As described above, where the limits of shifting capacity by adjusting dwell times for user beams are exceeded, the predicted spatial network resource demand may be used to smooth demand peaks by applying restrictions prior to a peak demand being reached.

Figure 8:
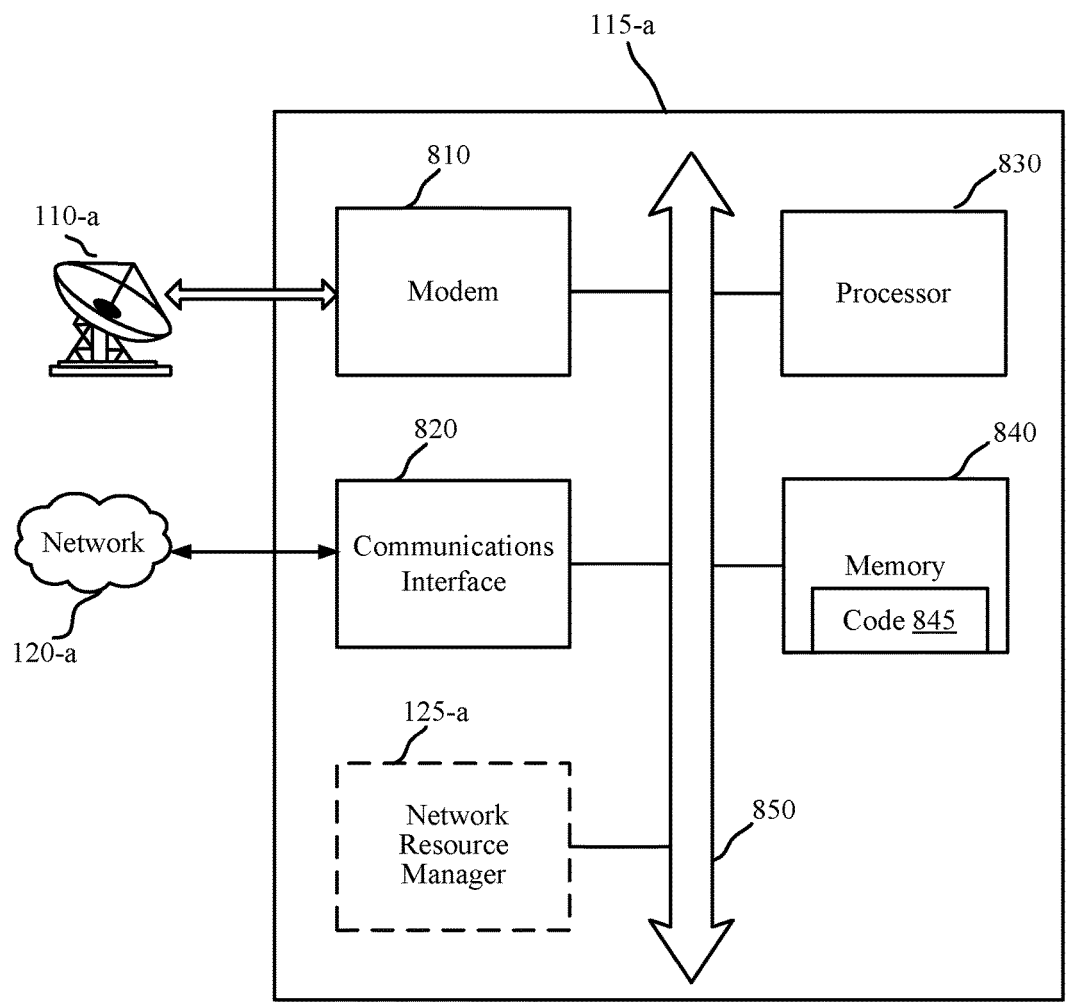
FIG. 8 is a block diagram illustrating an example of a gateway for dynamically allocating satellite network resource capacity based on network load forecasting, in accordance with various aspects of the present disclosure.

FIG. 8 is a block diagram illustrating an example of a gateway 115-*a* for dynamically allocating satellite network resource capacity based on network load forecasting, in accordance with various aspects of the present disclosure. The gateway 115-*a* may be an example of the gateway 115 described with reference to FIG. 1. The gateway 115-*a* may include a modem 810, communications interface 820, network resource manager 125-*a*, processor 830, memory 840, software code 845, and bus 850. Network resource manager 125-*a* may also be a separate entity (e.g., core node) of satellite communications system 100.

Modem 810 manages communications between the gateway 115-*a* and satellite 105 via ground station antenna system 110-*a*. Modem 810 may be configured to communicate with satellite 105 over one or more frequency bands (e.g., Ka, Ku, etc.) and may be configured to automatically orient antenna 110-*a* to transmit signals to and receive signals from satellite 105.

Communications interface module 820 controls network traffic to and from network 120-*a*. Communications interface 820 may implement wired network interfaces (e.g., Ethernet, Fibre Channel, etc.) and/or wireless network interfaces (e.g., IEEE 802.11 compliant interfaces, etc.).

Processor 830 may include an intelligent hardware device, e.g., a central processing unit (CPU), a microcontroller, an ASIC, etc. Processor 830 may process information received through modem 810 or communications interface 820, or information to be sent to communications interface 820 or modem 810 for transmission. Processor 830 may handle, alone or in connection with gateway 115-*a*, various aspects of allocating satellite capacity based on aircraft load forecasting.

Memory 840 may include random access memory (RAM) or read-only memory (ROM). Memory 840 may store computer-readable, computer-executable code 845 containing instructions that are configured to, when executed, cause processor 830 to perform various functions described herein. Alternatively, the code 845 may not be directly executable by processor 830 but be configured to cause the gateway 115-*a* (e.g., when compiled and executed) to perform various of the functions described herein.

Network resource manager 125-*a* may, in conjunction with memory 840 and processor 830, perform the functions described above including allocating satellite capacity based on aircraft network load forecasting. For example, network resource manager 125-*a* may predict spatial network resource demand for a service area over one or more service periods based on forecasted travel paths and predicted service demands for a plurality of mobile multi-user terminals, determine a satellite capacity resource configuration for a plurality of satellite user beams for the one or more service periods based on the predicted spatial network resource demand, and adapt characteristics of the plurality of satellite user beams for the one or more service periods based on the determined satellite capacity resource configuration.

The components of the gateway 115-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 9:
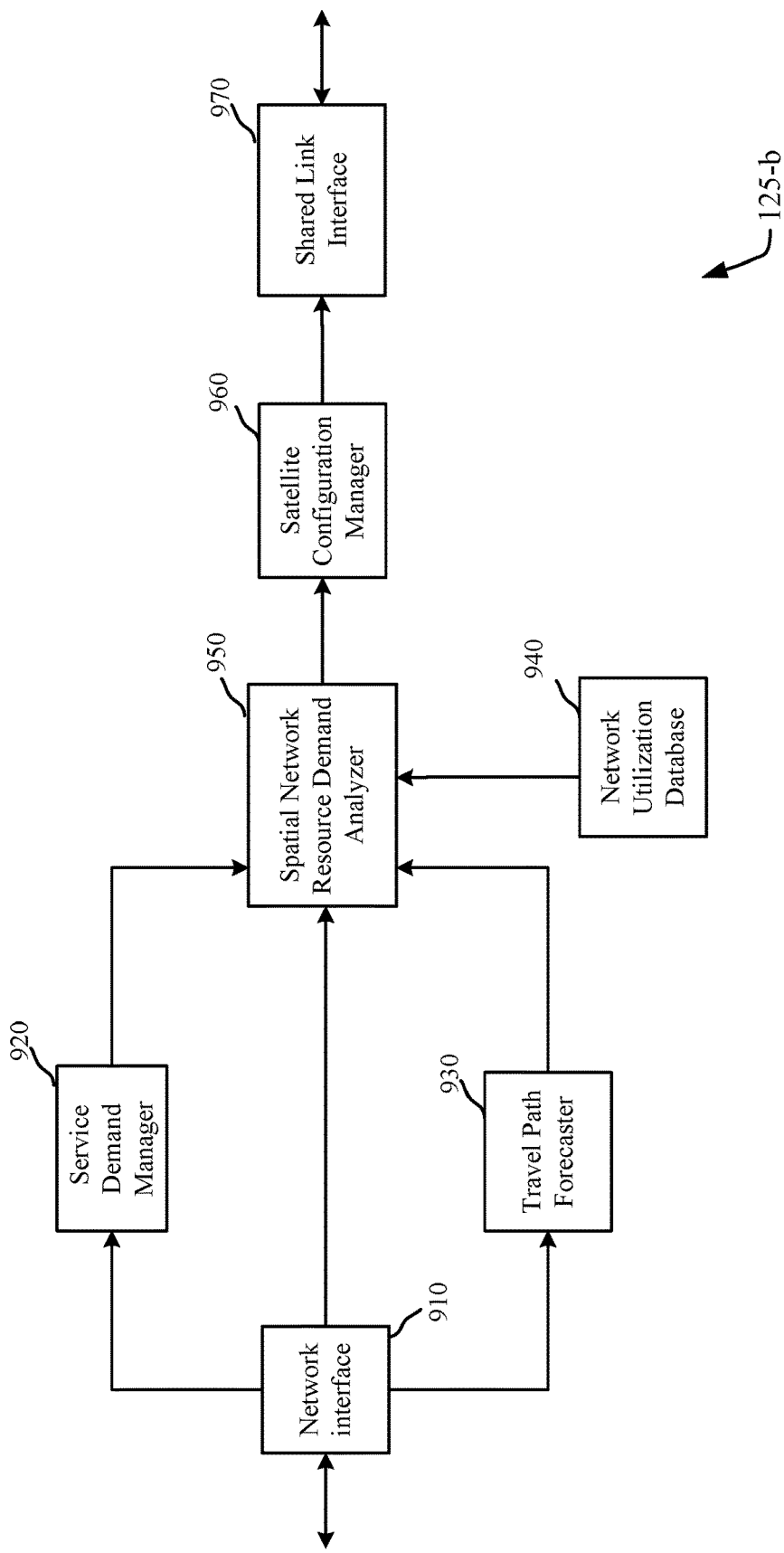
FIG. 9 is a block diagram illustrating an example of a network resource manager for dynamically allocating satellite network resource capacity based on network load forecasting, in accordance with various aspects of the present disclosure.

FIG. 9 is a block diagram illustrating an example of a network resource manager 125-*b* for dynamically allocating satellite network resource capacity based on network load forecasting, in accordance with various aspects of the present disclosure. Network resource manager 125-*b* may be an example of the network resource managers 125 described with reference to FIGS. 1 and 8. For example, network resource manager 125-*b* may be an example of network resource manager 125-*a* of FIG. 8 which may be in a separate entity (e.g., core node) of satellite communications system 100 of FIG. 1. Network resource manager 125-*b* may include network interface 910, service demand manager 920, travel path forecaster 930, network utilization database 940, spatial network resource demand analyzer 950, satellite configuration manager 960, and shared link interface 970. Each of these components may be communicatively coupled to each other.

Network interface 910 may receive route path data. Network interface 910 may forward this data to travel path forecaster 930. Travel path forecaster 930 may use the data to construct forecasted travel paths for aircraft for which it has route path data. Network interface 910 may also receive data regarding the number of passengers on aircraft or the number of passengers ticketed to travel on the aircraft and forward this data to service demand manager 920. Service demand manager 920 may determine predicted service demand for the aircraft for future service periods. The predicted service demand may be determined based on historical usage patterns (e.g., taking into account time of day), number of passengers on the aircraft or scheduled to be on the aircraft, and/or data rates (e.g., minIR, CIR, PIR) of service plans offered to passengers.

Spatial network resource demand analyzer 950 may use the forecasted travel paths to forecast spatial network resource demand for one or more future service periods using additional information such as current service demand by one or more mobile multi-user terminals, current service demand of fixed terminals with a service area, respective numbers of active users for the one or more mobile multi-user terminals, etc. For example, the predicted service demand for a future time period for an aircraft determined by the service demand manager 920 may be combined with the forecasted travel path to determine the predicted spatial service demand for the aircraft. The predicted spatial service demands for multiple aircraft may be summed and combined with predicted spatial service demand of fixed terminals to determine a predicted spatial network resource demand for a given service area. The predicted spatial network resource demand may include predicted demand for a number of time intervals within the future time period. For example, spatial network resource demand may be predicted for each of multiple time intervals (e.g., 5, 10, 20, 30 or 60 minute intervals, etc.).

Spatial network resource demand analyzer 950 may receive historical data such as the historical service demand of aircraft in a service area or service period, the historical network of fixed terminals within a service area or service period, the historical network utilization for service periods similar to those of the future service periods, etc., from network utilization database 940. With the received data, spatial network resource demand analyzer 950 may then predict a spatial network resource demand for a service area over one or more service periods.

Satellite configuration manager 960 may receive the predicted spatial network resource demand and determine a satellite capacity resource configuration for a plurality of satellite user beams for one or more service periods based on the predicted demand. The predicted spatial network resource demand may be unique to each of the plurality of service periods. Based on the determined configuration, satellite configuration manager 960 may adapt characteristics of satellite user beams for one or more service periods. These characteristics may include adapting at least one beamforming parameter for at least one satellite user beam, a dwell time for at least one satellite user beam, a bandwidth for at least one satellite user beam, a coverage area change, or combinations thereof. Shared link interface 970 may then forward the data to the gateway system 115. This data may be in the form of beamforming coefficients which may be applied at gateway system 115 or satellite 105, dwell time adjustments, or bandwidth adjustments.

Figure 10:
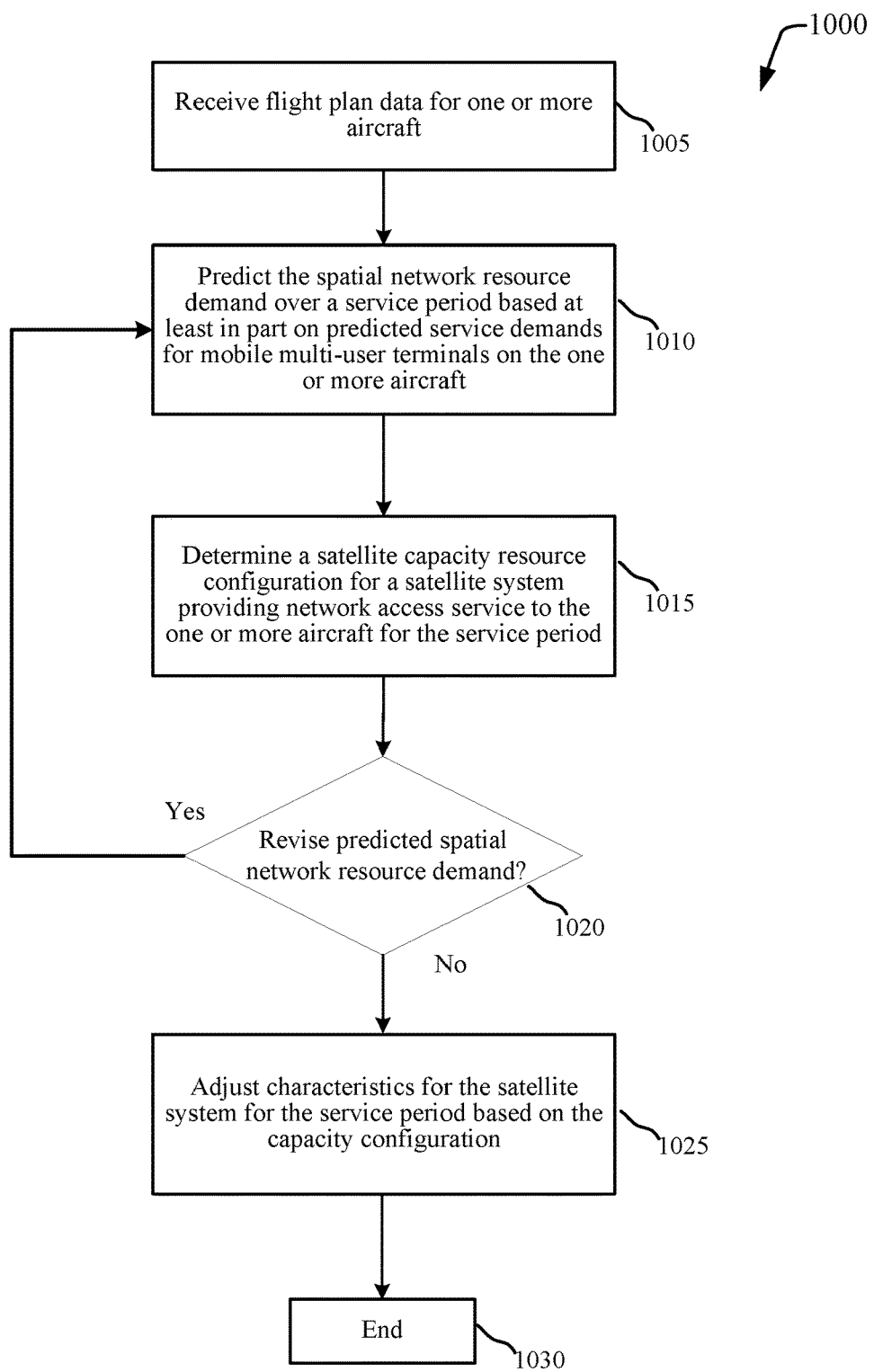
FIG. 10 is a flowchart diagram of an example method for dynamically allocating satellite network resource capacity based on network load forecasting, in accordance with various aspects of the present disclosure.

FIG. 10 is a flowchart diagram of an example method 1000 for dynamically allocating satellite network resource capacity based on network load forecasting, in accordance with various aspects of the present disclosure. The method 1000 may be performed, for example, by the network resource manager 125 of FIGS. 1, 8, and 9. The method 1000 may be employed in a multi-beam satellite system in which multiple user beams from a satellite 105 at least partially overlap each other. In some examples, the multi-beam satellite system includes multiple satellites 105.

At block 1005 of method 1000, network resource manager 125 receives route path data for one or more aircraft provided network access service via the multi-beam satellite system and forecasts travel paths for the one or more aircraft. The forecasted travel paths may be based on current route path data or recalculated based on a change in route path data for the one or more aircraft. Network resource manager 125 may receive this route path data via network 120 or it may receive the data from the aircraft 130 (e.g., via satellite 105).

Network resource manager 125 determines the spatial network resource demand for a service period based on the route path data and predicted service demands the aircraft at block 1010. One or more of the aircraft may not currently be provided network access service at the time the network resource demand is predicted. The respective predicted network service demand for the mobile multi-user terminals on the aircraft may vary based on the time of day. For example, there may be higher network demands during the middle of the day versus at night when some users of the mobile terminals may be asleep. Network resource manager 125 may attribute a value used in part to determine the predicted network service demand for the multi-user terminals based on the time of day the multi-user terminals are being utilized. Network resource manager 125 may determine the spatial network resource demand for multiple periodic time intervals (e.g., 5, 10, 20, 30 or 60 minute intervals, etc.), and may determine the service period by aggregating time intervals having a similar spatial network resource demand.

The predicted network resource demand may be based on a number of factors including the current service demand of the mobile multi-user terminals, the historical service demand of the mobile multi-user terminals, the current service demand of fixed terminals within a service area, the historical service demand of the fixed terminals, the time of day of the one or more service periods, the historical network utilization for service periods similar to those of the one or more service periods, the respective numbers of active users for the mobile multi-user terminals, the respective numbers of predicted users for the mobile multi-user terminals, a network service plan that is offered to users of the mobile multi-user terminals, or a combination thereof.

At block 1015, the network resource manager 125 determines a satellite capacity resource configuration for the multi-beam satellite system that provides network access service to the one or more aircraft. The satellite capacity resource configuration may affect a number of characteristics of how the multi-beam satellite system operates including what beam mode it chooses to operate, the frequencies, power, polarization, and direction of the beams, etc. The network resource manager 125 may determine separate satellite capacity resource configurations for each of multiple service periods.

At block 1020, the network resource manager 125 may monitor for changes that would affect predicted network resource demand and revise the predicted network resource demand. For example, changes in network conditions such as changes in actual demand relative to predicted demand may occur from a large number of users disconnecting/connecting from network use from the time the prediction occurred, different network applications being utilized (e.g., high data intensive applications such as streaming video), etc. In addition, changes to route paths (e.g., flight delays, etc.) may trigger updating of predicted network resource demand for affected service periods. Additionally or alternatively, actual spatial network resource demand for one service period being different than the predicted network resource demand for that service period may trigger updates to the predicted network resource demand for subsequent service periods. Because adapting characteristics of the satellite system may require large amounts of resource overhead to enact, the various triggers for revising the predicted network resource demand determined at block 1010 or revising the satellite capacity resource configuration determined at block 1015 may be based on changes to network conditions or updated spatial network resource demand for a service period exceeding a threshold. For example, an initial spatial network resource demand for a future service period may be predicted at block 1010 and a satellite capacity resource configuration for adapting a communication system to the spatial network resource demand may be determined at block 1015. Subsequently, the spatial network resource demand for the future service period may be updated via identifying a trigger such as a change to route path data at block 1020. The updated spatial network resource demand may be compared with the initial spatial network resource demand, and the satellite capacity resource configuration may be updated only if the updated spatial network resource demand exceeds (e.g., for one or more user beams) the initial spatial network resource demand by more than a predetermined threshold. In some examples, the spatial network resource demand for one or more future service periods are continually updated (e.g., at periodic intervals that are shorter than the service periods) based on up-to-date route path data, actual network conditions, and the like. For example, spatial network resource demand may be predicted for a first service period and a second service period, where the first service period precedes the second service period in time. At or during the first service period, a difference between an actual spatial network resource demand and the predicted spatial network resource demand for the first service period may be determined. The difference may be compared to a threshold. For example, the difference between an average or peak of the actual spatial network resource demand for the first service period for a given user beam or region and the predicted spatial network resource demand may be compared to a threshold (e.g., a beam demand threshold or regional demand threshold, etc.). In response to determining that the difference exceeds the threshold, the predicted spatial network resource demand for the second service period may be revised. The revised predicted spatial network resource demand for the second service period may take into account the actual spatial network resource demand of the first service period.

If, at block 1020, the start time of the service period is reached and no revisions to the predicted spatial network resource demand or satellite capacity resource configuration are identified, the network resource manager 125 proceeds to block 1025 to implement the satellite capacity resource configuration determined in block 1015 for the service period.

Based on the satellite capacity resource configuration determined in block 1015, the network resource manager 125 adjusts at least one characteristic for the multi-beam satellite system at block 1025. The network resource manager 125 may, for example, transmit a signal to the gateway 115 and/or satellite 105 to adjust at least one characteristic of satellite user beams transmitted by the satellite. Additionally or alternatively, at least one characteristic associated with return link transmissions from terminals (e.g., fixed terminals and/or mobile multi-user terminals aboard aircraft) may be adjusted. A variety of characteristics of the multi-beam satellite system may be adapted including changing at least one beamforming parameter for at least one satellite user beam, a dwell time for at least one satellite user beam, a bandwidth for at least one satellite user beam, a coverage area change, or combinations thereof. Additionally, adapting characteristics of the multi-beam satellite system may include re-configuring parameters for at least one fixed terminal or mobile multi-user terminal. With characteristics of the multi-beam satellite system configured for the service period, method 1000 may end at block 1030. Method 1000 may return to block 1005 upon detection of a trigger condition (e.g., changes to route paths, change in actual spatial network resource demand, etc.)

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for allocating satellite capacity in a multi-beam satellite system, comprising:
providing network access service over a service area via a plurality of satellite user beams;
predicting spatial network resource demand for the service area over one or more service periods based at least in part on forecasted travel paths of a plurality of mobile multi-user terminals over the one or more service periods and respective predicted service demands for the plurality of mobile multi-user terminals, wherein the one or more service periods are future service periods and include a first service period preceding a second service period;
determining a satellite capacity resource configuration for the plurality of satellite user beams for the one or more service periods based on the predicted spatial network resource demand;
adapting at least one characteristic of the plurality of satellite user beams for the one or more service periods based on the determined satellite capacity resource configuration;
determining a difference between an actual spatial network resource demand and the predicted spatial network resource demand for the first service period;
determining that the difference satisfies a threshold; and
in response to the determining that the difference satisfies the threshold, revising the predicted spatial network resource demand for the second service period based at least in part on the actual spatial network resource demand of the first service period.

2. The method of claim 1, wherein:
the respective predicted service demands for the plurality of mobile multi-user terminals varies based on time of day; and
the predicting the spatial network resource demand over the first service period of the one or more service periods comprises selecting a value for the respective predicted network demands for the plurality of mobile multi-user terminals based on a time of day of the first service period.

3. The method of claim 1, wherein the one or more service periods comprises a plurality of service periods, and wherein the predicted spatial network resource demand and the determined satellite capacity resource configurations are unique to each of the plurality of service periods.

4. The method of claim 1, further comprising:
determining the forecasted travel paths based at least in part on route path data for one or more mobile vessels for which the network access service is provided via respective ones of the plurality of mobile multi-user terminals.

5. The method of claim 4, wherein the forecasted travel paths are recalculated based at least in part on a change in the route path data for the one or more mobile vessels.

6. The method of claim 4, wherein the determined forecasted travel paths are based at least in part on current route data for the one or more mobile vessels.

7. The method of claim 1, wherein the at least one adapted characteristic comprises: at least one beamforming parameter for at least one satellite user beam, a dwell time for at least one satellite user beam, a bandwidth for at least one satellite user beam, a coverage area change, or combinations thereof.

8. The method of claim 1, wherein the predicted spatial network resource demand is based at least in part on one or more of: current service demand of the plurality of mobile multi-user terminals; historical service demand of the plurality of mobile multi-user terminals; current service demand of fixed terminals within the service area; historical service demand of the fixed terminals; the time of day of the one or more service periods; historical network utilization for service periods similar to those of the one or more service periods; respective numbers of active users for the plurality of mobile multi-user terminals; respective numbers of predicted users for the plurality of mobile multi-user terminals; or a network service plan that is offered to users of the plurality of mobile multi-user terminals.

9. The method of claim 1, wherein at least one of the plurality of mobile multi-user terminals is located on a mobile vessel that is currently not being provided network access service by the multi-beam satellite system.

10. The method of claim 1, wherein the spatial network resource demand is predicted for each user beam coverage area of the plurality of satellite user beams.

11. The method of claim 1, wherein the multi-beam satellite system comprises multiple satellites with service coverage areas that at least partially overlap with each other.

12. A network resource manager for allocating satellite capacity in a multi-beam satellite system, comprising:
a processor;
memory in electronic communication with the processor; and
instructions stored in the memory; wherein the instructions are executable by the processor to:
provide network access service over a service area via a plurality of satellite user beams;
predict spatial network resource demand for the service area over one or more service periods based at least in part on forecasted travel paths of a plurality of mobile multi-user terminals over the one or more service periods and respective predicted service demands for the plurality of mobile multi-user terminals, wherein the one or more service periods are future service periods and include a first service period preceding a second service period;
determine a satellite capacity resource configuration for the plurality of satellite user beams for the one or more service periods based on the predicted spatial network resource demand;
adapt at least one characteristic of the plurality of satellite user beams for the one or more service periods based on the determined satellite capacity resource configuration;
determine a difference between an actual spatial network resource demand and the predicted spatial network resource demand for the first service period;
determine that the difference satisfies a threshold; and
in response to the determining that the difference satisfies the threshold, revise the predicted spatial network resource demand for the second service period based at least in part on the actual spatial network resource demand of the first service period.

13. The network resource manager of claim 12, wherein:
the respective predicted service demands for the plurality of mobile multi-user terminals varies based on time of day; and
the instructions to predict the spatial network resource demand over the first service period of the one or more service periods are executable to cause the processor to:

select a value for the respective predicted network demands for the plurality of mobile multi-user terminals based on a time of day of the first service period.

14. The network resource manager of claim 12, wherein the one or more service periods comprises a plurality of service periods, and wherein the determined satellite capacity resource configurations are unique to each of the plurality of service periods.

15. The network resource manager of claim 12, wherein the instructions are executable to cause the processor to:
determine the forecasted travel paths based at least in part on route path data for one or more mobile vessels for which the network access service is provided via their respective multi-user network access terminals.

16. The network resource manager of claim 15, wherein the forecasted travel paths are recalculated based at least in part on a change in the route path data for the one or more mobile vessels.

17. The network resource manager of claim 15, wherein the determined forecasted travel paths are based at least in part on current route data for the one or more mobile vessels.

18. The network resource manager of claim 12, wherein the at least one adapted characteristic comprises: at least one beamforming parameter for at least one satellite user beam, a dwell time for at least one satellite user beam, a bandwidth for at least one satellite user beam, a coverage area change, or combinations thereof.

19. The network resource manager of claim 12, wherein the predicted spatial network resource demand is based at least in part on one or more of: current service demand of the plurality of mobile multi-user terminals; historical service demand of the plurality of mobile multi-user terminals; current service demand of fixed terminals within the service area; historical service demand of the fixed terminals; the time of day of the one or more service periods; historical network utilization for service periods similar to those of the one or more service periods; respective numbers of active users for the plurality of mobile multi-user terminals; respective numbers of predicted users for the plurality of mobile multi-user terminals;
or a network service plan that is offered to users of the plurality of mobile multi-user terminals.

20. The network resource manager of claim 12, wherein at least one of the plurality of mobile multi-user terminals is located on a mobile vessel that is currently not being provided network access service by the multi-beam satellite system.

21. The network resource manager of claim 12, wherein the spatial network resource demand is predicted for each user beam coverage area of the plurality of satellite user beams.

22. The network resource manager of claim 12, wherein the multi-beam satellite system comprises multiple satellites with coverage areas that at least partially overlap with each other.

* * * * *